July 5, 1938.   C. G. WILLIAMS   2,122,767
SCAVENGING IMPLEMENT
Filed March 19, 1936

Inventor
Christian G. Williams,

By Hardway Cathey
Attorneys

Patented July 5, 1938

2,122,767

UNITED STATES PATENT OFFICE 2,122,767

SCAVENGING IMPLEMENT

Christian G. Williams, Palacios, Tex.

Application March 19, 1936, Serial No. 69,624

1 Claim. (Cl. 15—104)

This invention relates to a scavenging implement.

An object of the invention is to provide an implement of the character described specially designed for use in removing sand, grit, and foreign matter from the inner side of pneumatic tire casings when it becomes necessary, in the course of making repairs, to remove and replace the inner inflatable tube.

In use, sand, grit, and other detritus accumulate in the casing of a pneumatic tire and when it becomes necessary to replace the inner tube, it is desirable to thoroughly cleanse the inside of the casing. This is very difficult without some type of cleaning apparatus with which the offending matter to be removed may be reached. The implement herein described has been provided for the purpose indicated.

Another object of the invention is to provide an implement of the character described that may be readily inserted into the casing and whereby the offending material may be recovered and removed.

It is still another object of the invention to provide an implement of the type specified that may be folded into compact form so that it may be readily carried about in the vehicle.

With the above and other objects in view, the invention has particular relation to certain novel features of construction, arrangement of parts and use, an example of which is given in this specification and illustrated in the accompanying drawing wherein.

Figures 1, 2:
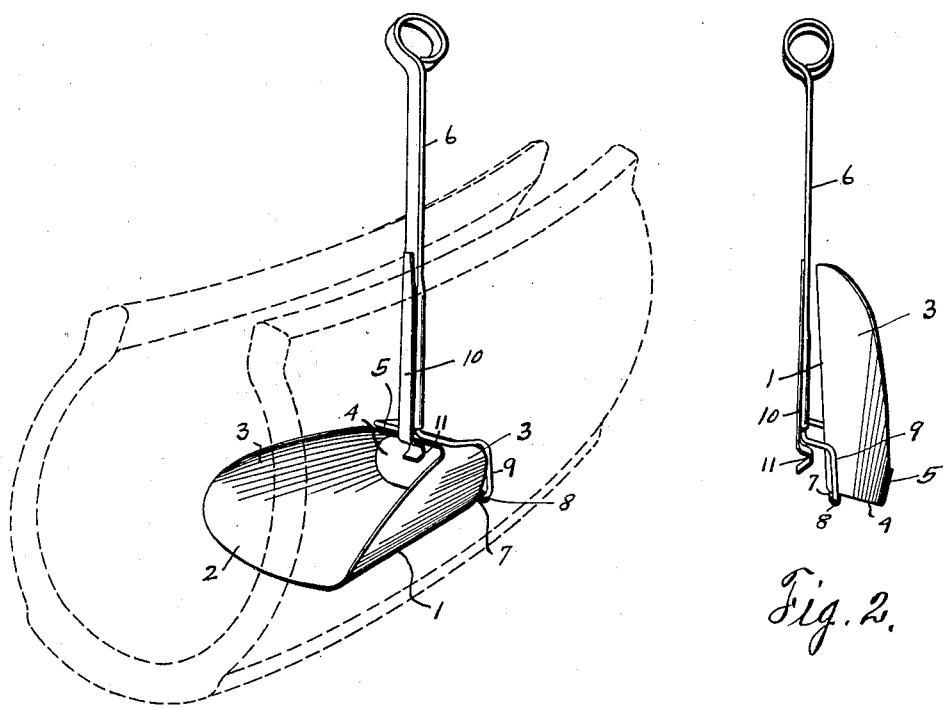
Figure 1 shows a perspective view of the implement.
Figure 2 shows a side view of the implement in collapsed position.

Referring now more particularly to the drawing wherein like numerals of reference designate the same parts in each of the figures, the numeral 1 designates a collector which is scooplike in form. The collector has a relatively wide bottom 2 which flares forwardly and which has the sides 3, 3, whose upper margins taper forwardly and merge with the forward margin of the bottom 2. The collector has a rear wall 4 extending entirely across the rear end thereof from top to bottom and at its rear end the collector has the transverse ledge 5.

There is a handle 6 and a transverse sleeve 7 secured to the outerside of the end 4 near the bottom and a hinge member has the cross-bar 8 extended through said sleeve and also has the side arms 9, 9, which are forwardly curved and whose free ends are inwardly turned and secured to the inner end of said handle, as is clearly shown in the drawing. When the implement is in operative position, the forwardly turned ends of the side arms 9 will lie on the ledge 5, as shown in Figure 1. There is a spring latch 10 fastened to the forward side of the handle 6 and whose free end has an overturned catch 11. When the implement is in operative position, as shown in Figure 1, the catch 11 engages underneath the free edge of the ledge 5 to hold the handle 6 and collector 1 in operating relation. When in this position the collector may be inserted edgewise through between the free margins of the casing and the collector lowered on to the inside tread portion of the casing. A brush or broom may be then used to sweep sand or other offending material into the collector and the offending material thus removed from the casing, or, the casing, when in upright position, may be partially rotated rearwardly so as to cause the offending material to roll into the collector to then be removed.

When the implement is not in use the handle 6 may be swung rearwardly to disengage the yieldable catch 11 from the ledge 5 and then may be swung on around into reversed position, as shown in Figure 2, thus collapsing the implement so that it may be readily carried about.

The implement herein described is specifically designed for cleaning pneumatic tire casings, although it is adapted for general use.

The drawing and description disclose what is now considered to be a preferred form of the invention by way of illustration only while the broad principle of the invention will be defined by the appended claim.

What I claim is:

A scavenging implement comprising a collector scoop-like in form having a relatively wide bottom which flares forwardly and having sides whose upper margins taper forwardly and merge with the forward margin of the bottom, said collector having a rear wall extending entirely across the rear end thereof from top to bottom, a transverse top ledge at the rear end of the collector, a handle, a transverse sleeve secured to the outer side of the rear end of the collector near the bottom thereof, a hinge member having a cross-bar extended through said sleeve and having arms which are forwardly curved and whose free ends are inwardly turned and secured to the inner end of the handle, a spring latch fastened to the forward side of the handle whose free end has an overturned catch engageable underneath the ledge when the implement is in operative position, said catch being releasable from the ledge upon rearward movement of the handle relative to the collector to permit the collector to be swung around into released position with the bottom of the collector substantially parallel with the handle.

CHRISTIAN G. WILLIAMS.